(12) United States Patent
Kawai

(10) Patent No.: US 9,160,925 B2
(45) Date of Patent: Oct. 13, 2015

(54) DRIVING DEVICE AND IMAGE INSTRUMENT COMPRISING THIS DRIVING DEVICE

(71) Applicant: Olympus Imaging Corp., Shibuya-ku, Tokyo (JP)

(72) Inventor: Sumio Kawai, Hachioji (JP)

(73) Assignee: OLYMPUS CORPORATION (JP)

( * ) Notice: Subject to any disclaimer, the term of this patent is extended or adjusted under 35 U.S.C. 154(b) by 83 days.

(21) Appl. No.: 14/081,293

(22) Filed: Nov. 15, 2013

(65) Prior Publication Data

US 2014/0139695 A1 May 22, 2014

(30) Foreign Application Priority Data

Nov. 19, 2012 (JP) ................. 2012-253577

(51) Int. Cl.
*H04N 5/232* (2006.01)
*G03B 5/00* (2006.01)
*G03B 17/14* (2006.01)

(52) U.S. Cl.
CPC ............. *H04N 5/23248* (2013.01); *G03B 5/00* (2013.01); *G03B 17/14* (2013.01); *G03B 2205/0015* (2013.01); *G03B 2205/0092* (2013.01); *G03B 2217/005* (2013.01); *H04N 5/23258* (2013.01); *H04N 5/23287* (2013.01)

(58) Field of Classification Search
CPC . H04N 5/2251; H04N 5/2253; H04N 5/2254; H04N 5/2328; H04N 5/23287; G03B 5/00; G03B 2205/0015; G02B 27/646
See application file for complete search history.

(56) References Cited

U.S. PATENT DOCUMENTS

| | | | | |
|---|---|---|---|---|
| 6,011,927 A * | 1/2000 | Kamata | ............................ | 396/55 |
| 2005/0270379 A1* | 12/2005 | Seo | ............... | 348/208.5 |
| 2006/0164516 A1* | 7/2006 | Kurosawa | ................ | 348/208.99 |
| 2008/0175573 A1* | 7/2008 | Iijima | .............................. | 396/55 |
| 2010/0284097 A1* | 11/2010 | Masuki | .......................... | 359/824 |
| 2013/0163973 A1* | 6/2013 | Tanaka | .............................. | 396/55 |
| 2014/0098421 A1* | 4/2014 | Umezu | .......................... | 359/554 |

FOREIGN PATENT DOCUMENTS

JP 2009169359 7/2009

* cited by examiner

*Primary Examiner* — Timothy J Henn
(74) *Attorney, Agent, or Firm* — Volpe and Koenig, P.C.

(57) ABSTRACT

A driving device moves a movable lens in a plane direction intersecting at right angles with an optical axis to correct a shake. The driving device includes a movable frame which holds the movable lens, a fixed frame facing the movable frame, three balls held between the movable frame and the fixed frame, a single tension spring which pulls the movable frame toward the fixed frame to press the three balls, and VCMs which move the movable frame relative to the fixed frame. The tension spring is located inside a triangle that connects the centers of the three balls and outside a holding region where the movable frame holds the movable lens.

14 Claims, 8 Drawing Sheets

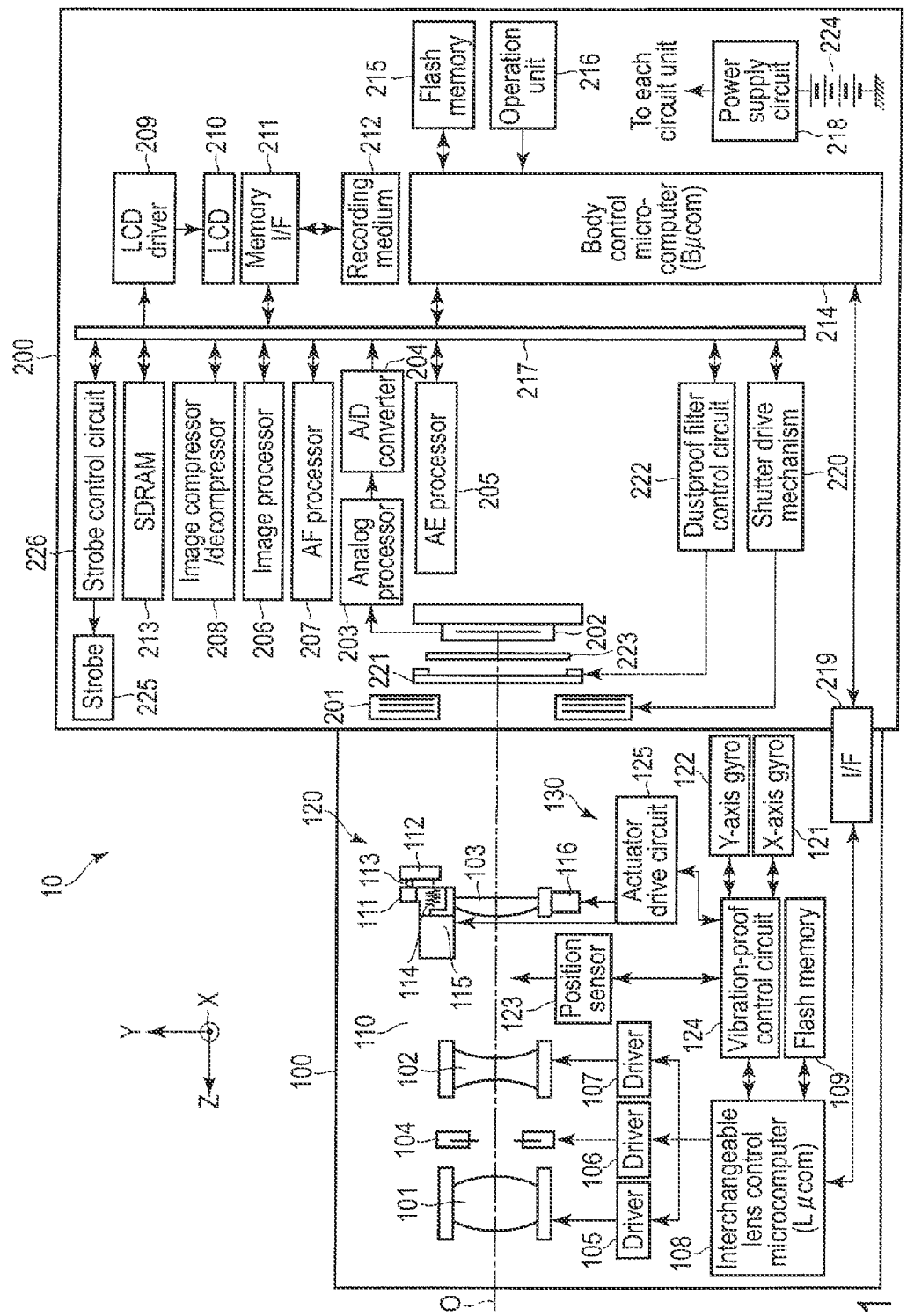
F I G. 1

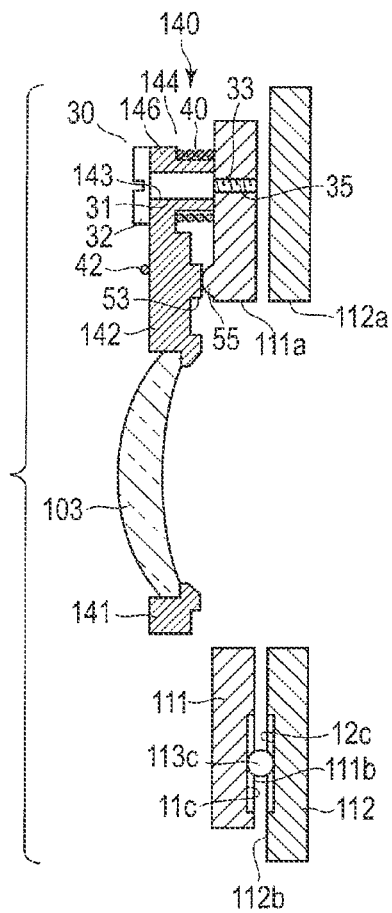
F I G. 4
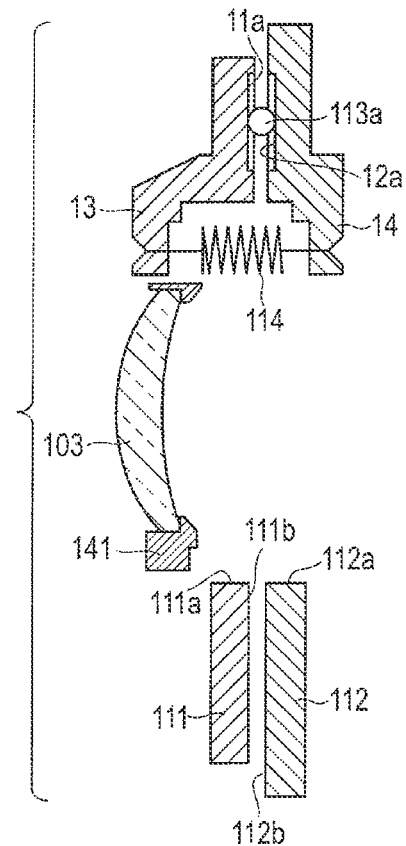
F I G. 5
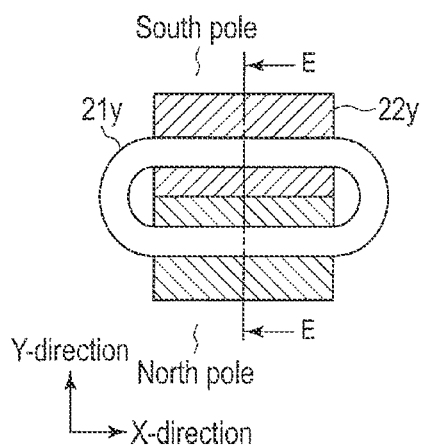
F I G. 6A
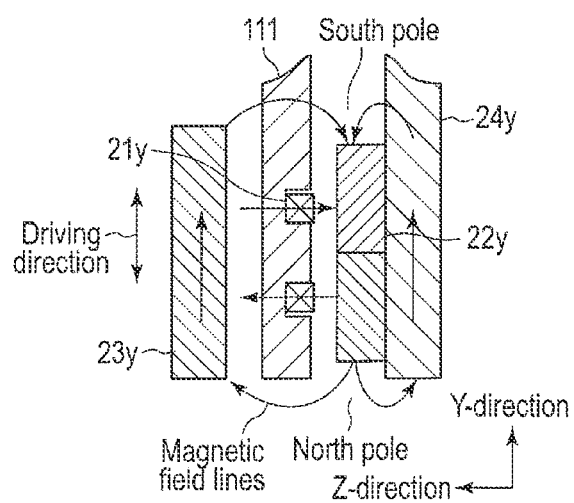
F I G. 6B

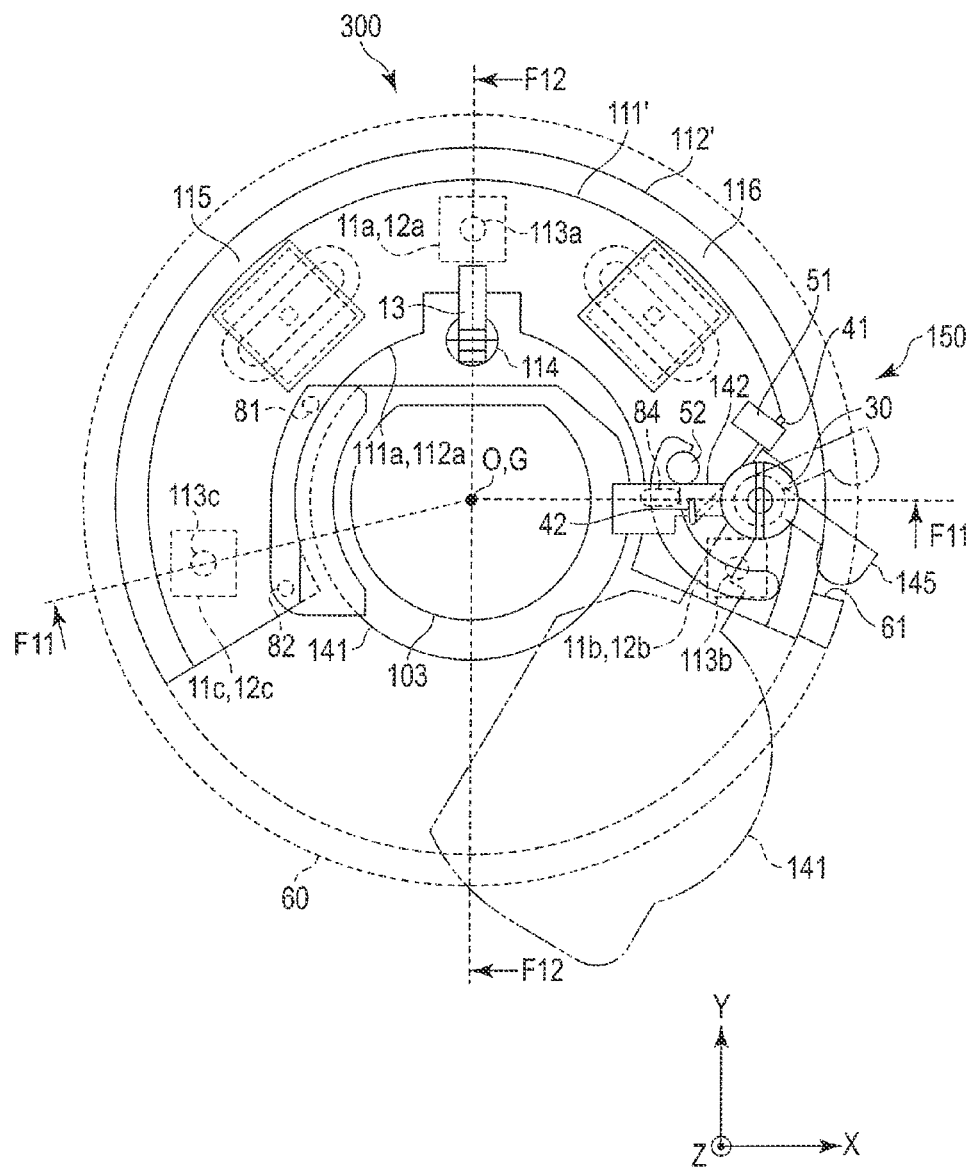
F I G. 10

DRIVING DEVICE AND IMAGE INSTRUMENT COMPRISING THIS DRIVING DEVICE

CROSS-REFERENCE TO RELATED APPLICATIONS

This application is based upon and claims the benefit of priority from prior Japanese Patent Application No. 2012-253577, filed Nov. 19, 2012, the entire contents of which are incorporated herein by reference.

BACKGROUND OF THE INVENTION

1. Field of the Invention

Embodiments described herein relate generally to a driving device which drives a lens and an image pickup device in a direction intersecting at right angles with an optical axis to correct a blurred image, and an image instrument such as a camera comprising this driving device.

2. Description of the Related Art

Recently, digital cameras capable of obtaining not only still images but also moving images have been on the market. Some of the digital cameras of this type have what is called a shake correction function to drive a movable frame which holds some of lenses constituting an imaging lens and an image pickup device in a direction intersecting at right angles with the optical axis of the imaging lens and thereby correct camera shaking by hand.

It is preferable that a driving device which drives the movable frame precisely and stably drives the movable frame for accurate correction of the shake. On the other hand, it is preferable that the driving device consumes a small amount of electricity because the shake correction is always working while the camera is active. It is also preferable that the driving device is small and light so that the camera is small and light.

A driving device known as one such example comprises three balls intervening between a movable frame and a fixed frame, a plurality of tension springs which pull the movable frame toward the fixed frame to press the three balls, and a set of voice coil motors (VCM) which drive the movable frame relative to the fixed frame in a direction intersecting at right angles with the optical axis.

However, in the conventional driving device described above, a plurality of tension springs are located outside a triangle that connects the centers of the three balls. Therefore, particularly when the tension springs differ in resilience due to manufacturing variation and assembly variation, the balance of press forces applied to the three balls by the movable frame and the fixed frame is lost, and the holding of the movable frame tends to be unstable. In the worst case, part of the movable frame may rise and precise drive control may be difficult if the variation of the tension springs is great.

Moreover, the conventional driving device described above requires a space to place a plurality of tension springs outside the triangle that connects the centers of the three balls, and therefore has a larger device configuration. Naturally, the mass of the movable frame is increased with the increase in device size, and a greater amount of electricity is consumed to drive the movable frame.

The present invention has been made in view of the above problems, and an object of the present invention is to provide a driving device and an image instrument equipped with this driving device which permit stable and precise driving of a movable frame, a smaller device configuration, and lower power consumption.

BRIEF SUMMARY OF THE INVENTION

A driving device (120) moves a movable lens (103) in a plane direction intersecting at right angles with an optical axis (O) to correct a shake. The driving device (120) includes a movable frame (111) which holds the movable lens (103), a fixed frame (112) facing the movable frame (111), three balls (113a, 113b, and 113c) held between the movable frame (111) and the fixed frame (112), a single tension spring (114) which pulls the movable frame (111) toward the fixed frame (112) to press the three balls (113), and VCMs (115 and 116) which move the movable frame (111) relative to the fixed frame (112). The tension spring (114) is located inside a triangle that connects the centers of the three balls (113a, 113b, and 113c) and outside a holding region where the movable frame (111) holds the movable lens (103).

BRIEF DESCRIPTION OF THE SEVERAL VIEWS OF THE DRAWING

FIG. 1 is a block diagram of a camera system according to an embodiment;

FIG. 4 is a sectional view of the driving device taken along the line F4-F4 in FIG. 2;

FIG. 5 is a sectional view of the driving device taken along the line F5-F5 in FIG. 2;

FIGS. 6A and 6B are diagrams illustrating the operation principle of the driving device in FIG. 2;

FIG. 10 is a front view of a driving device according to a second embodiment;

DETAILED DESCRIPTION OF THE INVENTION

Figure 2:
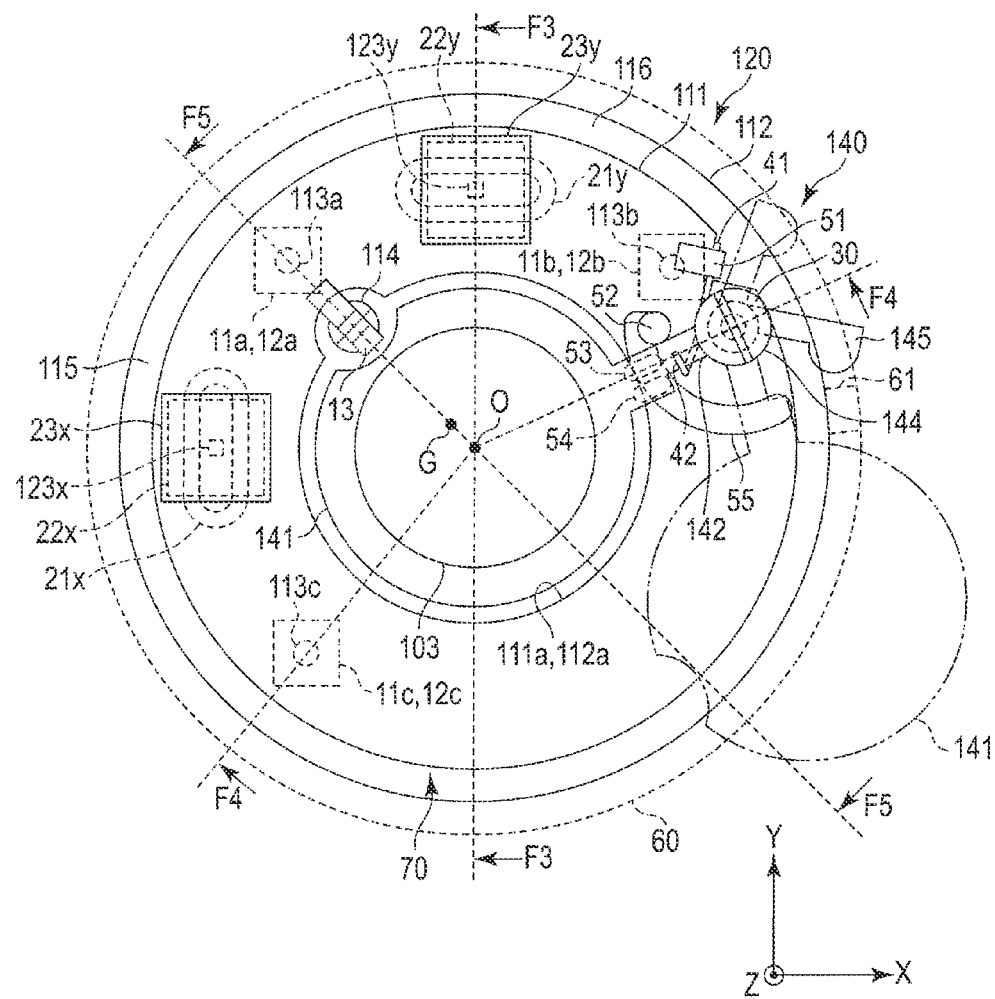
FIG. 2 is a front view of a driving device according to a first embodiment which drives a movable lens incorporated in an interchangeable lens of the camera system in FIG. 1 in a plane direction intersecting at right angles with an optical axis.

Hereinafter, embodiments of the present invention will be described with reference to the drawings.

In the drawings used for the following illustration, components may differ in scale so that each component has a recognizable size on the drawings. The present invention may not be limited to the number of components, the shapes of the components, the proportion of the sizes of the components, and the relative positions of the components that are shown in the drawings.

In the following illustration, the direction (from right to left in FIG. 1) toward a subject (not shown) from a camera body 200 is referred to as forward, and the opposite direction is referred to as backward. Moreover, an axis corresponding to an optical axis O of an optical system constituted by an interchangeable lens 100 is a Z-axis, and two axes intersecting at right angles with each other along a plane that intersects with the Z-axis are an X-axis and a Y-axis.

(First Embodiment)

A first embodiment of the present invention is described below with reference to the drawings.

FIG. 1 is a block diagram of a camera system 10 according to the first embodiment. In the case described here, the present invention is applied to a digital camera as an example of the image instrument. As shown in FIG. 1, this camera system 10 has a camera body 200 and an interchangeable lens 100 removable from the camera body 200. The interchangeable lens 100 is connected to the camera body 200 to be able to communicate with the camera body 200 via an interface (I/F) 219 when attached to the camera body 200 (condition in FIG. 1).

The interchangeable lens 100 has an imaging lens 110 for forming an image of an unshown subject. The imaging lens 110 coaxially has a focus lens 101, a variable power lens 102, and a movable lens 103 (optical members, optical lenses) along an optical axis O. The interchangeable lens 100 also has a diaphragm 104, and has three drivers 105, 106, and 107, a lens control microcomputer 108 (hereinafter referred to as a Lμcom 108), and a flash memory 109.

The driver 105 drives and controls the focus-adjustment focus lens 101 in the direction of the optical axis O. The driver 106 drives and controls a diaphragm blade of the diaphragm 104. The driver 107 drives and controls the variable power lens 102 in the direction of the optical axis O. The Lμcom 108 communicates with a body control microcomputer 214 (hereinafter referred to as a Bμcom 214) provided in the camera body 200 via the I/F 219 to control various control circuits in the interchangeable lens 100. The flash memory 109 stores information necessary for the control of the control circuits.

The peripheral portion of the movable lens 103 is held by a movable frame 111 (first member). A fixed frame 112 (second member) is located at a position adjoining and facing the back side of the movable frame 111 along the optical axis O. Three balls 113a, 113b, and 113c (rolling elements) (which may be collectively referred to as balls 113) functioning as spacers are located between the movable frame 111 and the fixed frame 112. A single tension spring 114 (urging member) which urges the movable frame 111 toward the fixed frame 112 to press the three balls 113 is attached between the movable frame 111 and the fixed frame 112.

A set of voice coil motors (VCM) 115 and 116 are attached to the movable frame 111 and the fixed frame 112. The VCMs 115 and 116 function as driving units to move the movable frame 111 relative to the fixed frame 112 along a plane (XY plane) intersecting at right angles with the optical axis O. One VCM 115 is an X-axis actuator 115 which moves the movable frame 111 relative to the fixed frame 112 in the X-axis direction. The other VCM 116 is a Y-axis actuator 116 which moves the movable frame 111 relative to the fixed frame 112 in the Y-axis direction.

That is, the movable frame 111, the fixed frame 112, the three balls 113, the tension spring 114, the X-axis actuator 115, and the Y-axis actuator 116 function as a driving device 120 which moves the movable lens 103 in a plane direction intersecting at right angles with the optical axis O.

Furthermore, the interchangeable lens 100 comprises a shake corrector 130 which actuates the driving device 120 to correct a hand shake. The shake corrector 130 has an X-axis gyro 121 and a Y-axis gyro 122 which detect a shake amount in the camera system 10, a position sensor 123 which detects the position of the movable lens 103 along the XY plane, a vibration-proof control circuit 124 which calculates a shake correction amount from the detected shake amount, the position in the plane direction, and optical information regarding the imaging lens 110, and an actuator drive circuit 125 which outputs drive signals to the X-axis actuator 115 and the Y-axis actuator 116 in accordance with the calculated shake correction amount.

On the other hand, the camera body 200 includes a shutter 201, a dustproof filter 221, an optical low pass filter 223, an image pickup device 202 (optical member, imaging unit), an analog processor 203, an analog/digital converter (hereinafter referred to as an "A/D converter") 204, an AE processor 205, an image processor 206, an AF processor 207, an image compressor/decompressor 208, an LCD driver 209, a memory interface (hereinafter referred to as a "memory I/F") 211, an SDRAM 213, the Bμcom 214, a flash memory 215, an operation unit 216, a battery 224, and a power supply circuit 218. The shutter 201 drives and controls the diaphragm blade by a shutter drive mechanism 220 at the time of imaging to control exposure. The dustproof filter 221 is ultrasonically vibrated by a dustproof filter control circuit 222 to remove dust appearing in an image. The optical low pass filter 223 removes a component having a high spatial frequency in an optical image generated by the imaging lens. The image pickup device 202 converts the optical image generated by the imaging lens into an electric signal. The analog processor 203 performs analog processing such as noise elimination of the electric signal of the image pickup device 202. The A/D converter 204 converts an analog output of the analog processor 203 to a digital image signal. The AE processor 205 measures light from the subject to output information for controlling image exposure during imaging. The image processor 206 processes an obtained image to output image information to be finally output. The AF processor 207 detects the in-focus position of the optical image generate by the imaging lens to output information for focus control. The image compressor/decompressor 208 compresses the obtained image information, and decompresses the compressed information. The LCD driver 209 controls a liquid crystal display (LCD) 210 which displays the obtained image and information regarding the photography. The memory I/F 211 records the obtained image and the information regarding the photography in a recording medium 212, or calls the obtained image and the information regarding the photography. The SDRAM 213 temporarily stores the obtained image information. The Bμcom 214 controls electric circuits in the camera system through a bus 217. The flash memory 215 stores control information. The operation unit 216 serves to operate the camera body 200, for example, a release, dials, and buttons.

An internal strobe 225 and a strobe control circuit 226 are disposed in the camera body 200. The strobe control circuit 226 controls the operation of the strobe 225 under the instruction from the Bμcom 214. However, this strobe is not described in detail here.

The function of each component of the camera system 10 in FIG. 1 is described below in detail.

The focus lens 101 moves in the optical axis direction and thereby focuses an optical image of the subject on a light-receiving surface of the image pickup device 202. The variable power lens 102 changes the focal distance of the imaging lens 110 and thereby changes the magnification of the optical image of the subject. The focus lens 101 may be actuated when the magnification of the optical image is changed. The optical member which is moved to displace the in-plane position of the imaging lens 110 intersecting at right angles with the optical axis of the optical image does not need to be the movable lens 103 as in the present embodiment, and may be the focus lens 101 or the variable power lens 102, or one of the lenses constituting the focus lens 101 and the variable power lens 102. The focus lens 101, the variable power lens 102, and the movable lens 103 are shown as single lenses. However, each of these lenses may be configured to have a plurality of lenses, and may include an optical element such as an optical filter.

The Lμcom 108 is connected to the drivers 105, 106, and 107, the I/F 219, the flash memory 109, and the vibration-proof control circuit 124. The Lμcom 108 reads and writes the information stored in the flash memory 109, and controls the drivers 105, 106, and 107 and the vibration-proof control circuit 124. The Lμcom 108 can communicate with the Bμcom 214 via the I/F 219. The Lμcom 108 sends various kinds of information to the Bμcom 214, and receives various kinds of information from the Bμcom 214.

For example, the Lμcom 108 sends, to the Bμcom 214, information corresponding to the state of a lens operating member (not shown), an output signal (detection signal) of the position sensor 123, the positions of the focus lens 101, the variable power lens 102, and the diaphragm 104, and information corresponding to a status signal. For example, the Lμcom 108 receives control information for the vibration-proof control circuit 124 from the Bμcom 214. Further, the Lμcom 108 controls the vibration-proof control circuit 124 in accordance with the control information received from the Bμcom 214.

The driver 105 drives the focus lens 101 to change the focal position in response to an instruction from the Lμcom 108. The driver 106 drives the variable power lens 102 to change the focal distance in response to an instruction from the Lμcom 108. The driver 107 drives the diaphragm 104 to adjust the light amount of the subject in accordance with an instruction from the Lμcom 108. More specifically, the focus lens 101 is driven by an unshown actuator such as a stepping motor, a VCM, or an ultrasonic motor provided in the driver 105. The variable power lens 102 is driven by an unshown actuator such as a stepping motor, a VCM, or an ultrasonic motor provided in the driver 106. The diaphragm 104 is driven by an unshown stepping motor in the driver 107.

The vibration-proof control circuit 124 controls the actuator drive circuit 125 under the control of the Lμcom 108. The X-axis actuator 115 and the Y-axis actuator 116 drive the movable frame 111 which holds the movable lens 103 and correct a shake when receiving, from the actuator drive circuit 125, a control signal for the drive amount of the actuator corresponding to the shake correction amount from the vibration-proof control circuit 124. Here, the X-axis actuator 115 and the Y-axis actuator 116 comprise VCMs described later in detail. However, such drive units may comprise stepping motors, ultrasonic motors, or piezoelectric elements.

The position sensor 123 detects a two-dimensional position of the movable lens 103 in the plane direction intersecting at right angles with the optical axis O, and outputs the detection signal to the vibration-proof control circuit 124. The position sensor 123 has a detection range and accuracy required for the movable lens 103. As will be described in detail later, the position sensor 123 comprises, for example, hall elements 123x and 123y (see FIG. 2 and FIG. 3) provided in the movable frame 111 to face magnets 22x and 22y provided in the fixed frame 112. It should be appreciated that a giant magnetoresistive element (GMR) or an optical or electrostatic element may be used for the direction of the position of the movable lens 103. Although not shown, movable mechanisms are used in the focus lens 101, the variable power lens 102, and the diaphragm 104, and respectively have position detection mechanisms to detect the position of a movable member.

The shutter 201 is driven in response to an instruction from the Bμcom 214, and controls the time of exposing the image of the subject to the image pickup device 202. For example, the shutter 201 has two front and rear shutter curtains, and a slit formed by the two curtains extends on the short side or long side of the image pickup device 202 so that exposure is performed. The shutter 201 may be located in front of or in the rear of the diaphragm 104 of the interchangeable lens 100, and may be a diaphragm shutter having a diaphragm function and a shutter function.

The image pickup device 202 has a structure in which, for example, color filters of bayer arrangement are disposed in front of photodiodes constituting each pixel. The bayer arrangement has a line on which R pixels and G (Gr) pixels are alternately arranged in a horizontal direction, and a line on which G (Gb) pixels and B pixels are alternately arranged in a horizontal direction. These two lines are also alternately arranged in a vertical direction so that the bayer arrangement is structured. The light collected by the focus lens 101, the variable power lens 102, and the movable lens 103 is received and photoelectrically converted by the photodiodes constituting the pixels. The image pickup device 202 thereby outputs the light amount as a charge amount to the analog processor 203. The image pickup device 202 may be either a CMOS type or a CCD type.

The analog processor 203 shapes the waveform of the electric signal (analog image signal) read from the image pickup device 202 after the reducing, reset noise, and further increases gains to obtain desired brightness. The A/D converter 204 converts the analog image signal output from the analog processor 203 into a digital image signal (hereinafter referred to as image data).

The bus 217 is a transfer channel for transferring various data generated in the digital camera to various components inside the digital camera. The bus 217 connects the AE processor 205, the image processor 206, the AF processor 207, the image compressor/decompressor 208, the LCD driver 209, the memory I/F 211, the SDRAM 213, and the Bμcom 214.

The image data output from the A/D converter 204 is temporarily stored in the SDRAM 213 via the bus 217. The SDRAM 213 is a storage unit for temporarily storing various data such as the image data obtained in the A/D converter 204, and the image data processed in the image processor 206 and the image compressor/decompressor 208.

The image processor 206 performs various kinds of image processing of the image data read from the SDRAM 213. The image data after the various kinds of processing by the image processor 206 is stored in the SDRAM 213.

The AE processor 205 calculates the luminance of the subject from the image data. Data for calculating the luminance of the subject may be the output of an exclusive photometric sensor.

The AF processor 207 takes out a signal having a high-frequency component from the image data, and acquires an in-focus evaluation value by autofocus (AF) integrating processing. At the same time, some of the lenses constituting the imaging lens 110 are driven to vibrate in the optical axis direction. This AF processing is performed by the use of images obtained at the position where the focal position is close to the subject and in the vicinity of the position where the focal position is far from the subject. As a result, the direction where the focal position is located can be determined by the comparison of the in-focus evaluation values. Recognizing the direction where the focal position is located permits AF driving at a higher speed.

The image compressor/decompressor 208 compresses the image data by a predetermined compression scheme, and decompresses (expands) the image data compressed by the predetermined compression scheme. For example, when the image data to be handled is a still image, the image compressor/decompressor 208 compresses and decompresses the image data compliant with a JPEG scheme. When the image data to be handled is a moving image, the image compressor/decompressor 208 compresses and decompresses the image data compliant with a motion-JPEG scheme or an H.264 scheme. When recording the image data regarding the still image, the image compressor/decompressor 208 reads the image data from the SDRAM 213, and compresses the read image data in accordance with, for example, the JPEG compression scheme, and then temporarily stores the compressed JPEG image data in the SDRAM 213.

The Bµcom 214 adds a JPEG header necessary to construct a JPEG file to the JPEG image data stored in the SDRAM 213 to create a JPEG file, and records the created JPEG file in the recording medium 212 via the memory I/F 211. The recording medium 212 is, but not limited to, a recording medium such as a memory card removable from the camera body 200.

The LCD driver 209 displays images on the LCD 210. The image display includes a rec-view display for displaying image data only for a short time immediately after photography, reproduction display of the JPEG file recorded in the recording medium 212, and moving image display such as live view display. When reproducing the JPEG file recorded in the recording medium 212, the image compressor/decompressor 208 reads and expands (decompresses) the JPEG file recorded in the recording medium 212, and then temporarily stores the expanded image data in the SDRAM 213. The LCD driver 209 reads the expanded image data from the SDRAM 213, and converts the read image data into a video signal, and then outputs the video signal to the LCD 210 to display an image.

The Bµcom 214 has the overall control of various sequences of the camera body 200. The operation unit 216 and the flash memory 215 are connected to the Bµcom 214.

The operation unit 216 includes operational elements such as a power button, a release button, a reproduction button, a menu button, a moving image button, and various input keys. If a user operates any of the operational elements of the operation unit 216, the Bµcom 214 performs various sequences corresponding to the operation by the user.

The power button is an operational element for switching on and off the digital camera. When the power button is pressed, the Bµcom 214 switches on or off the digital camera.

The release button comprises a double switch having a first release switch and a second release switch. When the first release switch is turned on by half-pressing of the release button, the Bµcom 214 performs a photography preparing sequence including, for example, AE processing and AF processing. When the second release switch is turned on by full-pressing of the release button, the Bµcom 214 performs a photography sequence to conduct photography.

The reproduction button is an operational element for instructing to reproduce a file recorded in the recording medium 212. When the reproduction button is pressed, the Bµcom 214 performs a reproduction sequence to perform reproduction.

The menu button is an operational element for instructing to display a menu which enables the change of camera setting. When the menu button is pressed, the Bµcom 214 performs a camera setting sequence to conduct, for example, menu display.

The moving image button is an operational element for giving a moving image photography instruction. When the moving image button is pressed, the Bµcom 214 performs a moving image photography sequence to conduct moving image photography.

The flash memory 215 stores various parameters necessary for the operation of the digital camera such as a white balance gain corresponding to a white balance mode and a low pass filter coefficient, image data regarding a granular pattern resembling a granular feel obtained by silver salt grains, and a serial number for the identification of the digital still camera. The flash memory 215 also stores various programs to be executed in the Bµcom 214. In accordance with the program stored in the flash memory 215, the Bµcom 214 reads parameters necessary for various sequences from the flash memory 215, and performs various kinds of processing.

Now, the driving device 120 according to the first embodiment which drives the movable frame 111 holding the movable lens 103 incorporated in the interchangeable lens 100 in the plane direction intersecting at right angles with the optical axis O is described in detail with reference to FIG. 2 to FIG. 5.

Figure 3:
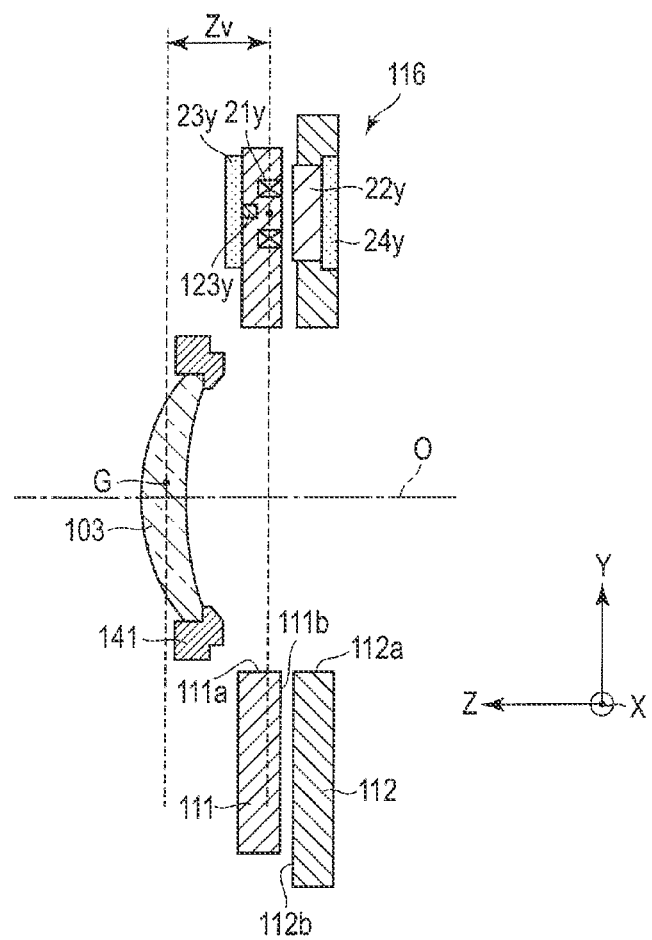
FIG. 3 is a sectional view of the driving device in FIG. 2 taken along the line F3-F3.

FIG. 2 is a front view of the driving device 120 from the front side (the side of the unshown subject). FIG. 3 is a sectional view of the driving device 120 taken along the line F3-F3 in FIG. 2 through the center of the Y-axis actuator 116. FIG. 4 is a sectional view of the driving device 120 taken along the line F4-F4 in FIG. 2 through a rotation shaft 30 of an evacuation mechanism 140 described later. FIG. 5 is a sectional view of the driving device 120 taken along the line F5-F5 in FIG. 2 through the tension spring 114.

As described above, the driving device 120 has the movable frame 111, the fixed frame 112, the three balls 113a, 113b, and 113c, the tension spring 114, the X-axis actuator 115, and the Y-axis actuator 116. That is, the driving device 120 is a device which passes electricity through the X-axis actuator 115 and/or the Y-axis actuator 116 to move the movable frame 111 relative to the fixed frame 112 and thereby moves the movable lens 103 in the plane direction intersecting at right angles with the optical axis O. Here, the Y-axis actuator 116 is described by way of example, and the X-axis actuator 115 is not described in detail. However, it should be understood that the X-axis actuator 115 is similar in structure and function to the Y-axis actuator 116.

As shown in FIG. 2, the movable frame 111 and the fixed frame 112 are substantially annular plate materials having substantially circular openings 111a and 112a in their centers. The movable frame 111 and the fixed frame 112 are located slightly apart from each other in the direction of the optical axis O and parallel to the XY plane intersecting at right angles with the optical axis O so that the centers of the openings 111a and 112a overlap the optical axis O of the interchangeable lens 100. As shown in FIG. 3 to FIG. 5, in the present embodiment, the movable frame 111 is located ahead of the fixed frame 112. Moreover, in the present embodiment, the opening 111a of the movable frame 111 and the opening 112a of the fixed frame 112 have the same opening diameter.

As shown in FIG. 3 to FIG. 5, a substantially annular plate-shaped lens frame 141 which holds the peripheral portion of the movable lens 103 is provided at a position overlapping the opening 111a further ahead of the movable frame 111. The lens frame 141 has an outside diameter slightly smaller than that of the opening 111a of the movable frame 111. That is, an annular clearance (see FIG. 2) is formed between the outer circumferential edge of the lens frame 141 and the circumferential edge of the opening 111a when viewed from the front.

The lens frame 141 is attached to the movable frame 111 so that the movable lens 103 can be moved in the plane direction and thus evacuated to a position which is out of alignment with the optical axis O. When located at a position (position indicated by a solid line in FIG. 2) overlapping the opening 111a of the movable frame 111, the lens frame 141 is combined with the movable frame 111, and is movable together with the movable frame 111. That is, in the present embodiment, the movable lens 103 is not held directly by the movable frame 111, but is held by the movable frame 111 via the lens frame 141. The lens frame 141 is moved in the plane direction by the evacuation mechanism 140 described later and thus evacuated to the position (position indicated by a broken line in FIG. 2) which is out of alignment with the optical axis O.

The three balls 113a, 113b, and 113c having the same diameter are located between the movable frame 111 and the fixed frame 112. As the opening 111a of the movable frame 111 is a space (holding region) to dispose the movable lens 103, the three balls 113a, 113b, and 113c are naturally located outside the opening 111a. The three balls 113a, 113b, and 113c function to form clearances between the movable frame 111 and the fixed frame 112 and stabilize the position of the movable frame 111 relative to the fixed frame 112 in the direction of the optical axis O.

That is, three rectangular recesses 11a, 11b, 11c, 12a, 12b, and 12c for receiving and disposing the three balls 113a, 113b, and 113c are respectively provided in inner surfaces 111b and 112b on which the movable frame 111 and the fixed frame 112 face each other. The three recesses 11a, 11b, and 11c of the movable frame 111 are provided at positions facing the three recesses 12a, 12b, and 12c of the fixed frame 112.

The depth from the inner surface 111b of the movable frame 111 to the bottom of each of the recesses 11a, 11b, and 11c and the depth from the inner surface 112b of the fixed frame 112 to the bottom of each of the recesses 12a, 12b, and 12c are designed to have the same value. Thus, if the movable frame 111 and the fixed frame 112 are located to face each other to press the balls 113a, 113b, and 113c received in the respective recesses, the inner surfaces 111b and 112b are parallel to each other. In this case, the clearance between the inner surface 111b of the movable frame 111 and the inner surface 112b of the fixed frame 112 has a size equal to double the depth of the recess from which the diameter of the ball is subtracted.

The balls 113a, 113b, and 113c are respectively received and disposed with play in the recesses 11a, 11b, and 11c of the movable frame 111 and the recesses 12a, 12b, and 12c of the fixed frame 112. Therefore, the movable frame 111 are movable relative to the fixed frame 112 in the plane direction, and the balls 113a, 113b, and 113c are also movable in the recesses in the plane direction. That is, the central positions of the balls 113a, 113b, and 113c disposed in the recesses move along the XY plane, but are located at the vertexes of a triangle in a plane intersecting at right angles with the optical axis O, so that the inner surface 111b of the movable frame 111 and the inner surface 112b of the fixed frame 112 are stably kept parallel.

As shown in FIG. 5, the single tension spring 114 is attached between the movable frame 111 and the fixed frame 112. As shown in FIG. 2, this tension spring 114 is located inside the triangle that connects the centers of the three balls 113a, 113b, and 113c. In other words, the point of application of the force by the tension spring 114 is located inside the triangle that connects the centers of the three balls 113a, 113b, and 113c.

It should be appreciated that the tension spring 114 is attached outside the opening 111a of the movable frame 111 (and outside the opening 112a of the fixed frame 112). Therefore, in reality, the tension spring 114 is located inside one angle of the above-mentioned triangle, as shown in FIG. 2. The three balls 113a, 113b, and 113c can roll in the recesses in the plane direction as described above. However, even if the three balls have moved to any positions, the tension spring 114 is located inside the above-mentioned triangle.

More specifically, as shown in FIG. 2 and FIG. 5, a hook 13 for hooking one end of the tension spring 114 is provided at the edge of the opening 111a of the movable frame 111 so that the hook 13 projects forward together with the movable frame 111. On the other hand, a hook 14 facing the hook 13 on the side of the movable frame 111 is also provided to project backward at the edge of the opening 112a of the fixed frame 112. The positions of these two hooks 13 and 14 along the plane direction correspond to the location of the tension spring 114. Therefore, these two hooks 13 and 14 are provided in the vicinity of the ball 113a which forms one angle of the above-mentioned triangle.

The projection height of each of the two hooks 13 and 14 in the opposite direction is designed to allow the slightly expanded tension spring 114 to be attached. The resilience of the tension spring 114 serves as force to pull the movable frame 111 closer to the fixed frame 112. In other words, the tension spring 114 expanded at both ends can be hooked and attached to the hooks 13 and 14.

In the present embodiment, the two hooks 13 and 14 inwardly project toward the center of the opening to facilitate the attachment of the tension spring 114. Therefore, as shown in FIG. 2, the tension spring 114 attached to the tips of the two hooks 13 and 14 is not located outside the opening 111a of the movable frame 111, and strictly speaking, partly overlaps the edges of the opening 111a of the movable frame 111 and the opening 112a of the fixed frame 112. In order to reduce the overlap, the edges of the opening 111a of the movable frame 111 and the opening 112a of the fixed frame 112 have shapes withdrawn slightly outward at the attachment positions of the hooks 13 and 14.

On the other hand, the outer circumferential edge of the lens frame 141 which holds the movable lens 103 is also annularly cut out inward in its part facing the tension spring 114 to avoid interference with the tension spring 114. Therefore, given that the holding region of the movable lens 103 is prescribed at the outer circumferential edge of the lens frame 141, the tension spring 114 is located outside the holding region of the movable lens 103.

In any case, in the present embodiment, the tension spring 114 is attached inside the triangle that connects the centers of the three balls 113a, 113b, and 113c. Therefore, tensile force resulting from the single tension spring 114 can be dispersed and thus applied to the three balls 113a, 113b, and 113c, and the force of the tension spring 114 is proportional to moment resulting from the force of the tension spring 114. Thus, it is possible to inhibit the variation of press force applied to the three balls 113a, 113b, and 113c, and stably hold the movable frame 111 relative to the fixed frame 112, as compared with the case where a plurality of springs are located outside a triangle.

However, in the layout in which the movable lens 103 having a relatively large region is located in the center of the movable frame 111 as in the present embodiment, it is difficult to dispose the tension spring 114 in the vicinity of the center of the movable frame 111. On the other hand, it is known that the movable frame 111 can be more stably held if the tension spring 114 is located in the vicinity of the center of gravity of the movable frame 111 (to be precise, the center of gravity G of a movable body 70 described later). Therefore, in the present embodiment, the tension spring 114 is located as close to the center of the movable frame 111 as possible, as will be described.

Furthermore, when the single tension spring 114 is located inside the triangle as in the present embodiment, a plurality of tension springs do not need to be located outside the triangle, and the number of tension springs can be reduced. As the tension spring is not located outside the triangle, the diameters of the movable frame 111 and the fixed frame 112 along the plane direction can be reduced. That is, according to the present embodiment, the movable frame 111 can be more stably held, and the driving device 120 can be smaller and lighter, so that power consumption can be reduced accordingly.

As shown in FIG. 2 and FIG. 3, the Y-axis actuator 116 includes a coil 21y, a magnet 22y, and two yokes 23y and 24y. The coil 21y is an insulated conductive thin wire which is wound into an oval shape more than one time, and is fixed to the movable frame 111, for example, by adhesion. The magnet 22y has a rectangular plate-shaped structure, and is fixed to the fixed frame 112, for example, by adhesion. The two yokes 23y and 24y are magnetic bodies which are located on the passages of magnetic field lines generated by the coil 21y and the magnet 22y and thus form a magnetic field circuit. One yoke 23y is attached to the front side of the movable frame 111 apart from the front of the coil 21y. The other yoke 24y is attached to the rear side of the fixed frame 112 in contact with the rear surface of the magnet 22y.

Here, the operation principle the VCM is described with reference to FIG. 6. FIG. 6(a) shows a front view of the VCM which functions as the Y-axis actuator 116. FIG. 6(b) shows a sectional side view of the VCM in FIG. 6(a) along the line E-E. The magnet 22y is magnetized in the Y-axis direction so that the north pole is on the lower side of the drawing and the south pole is on the upper side.

If a current is passed through the coil 21y placed in the magnetic field generated by the magnet 22y, force acts in a direction which is determined by the Fleming's law in accordance with the direction of the magnetic field lines and the direction of the current, and the movable frame 111 which holds the coil 21y is moved relative to the fixed frame 112. The magnet 22y of the Y-axis actuator 116 is polarized along the Y-axis direction as described above, and the coil 21y is laid out to pass each magnetic pole. Therefore, if a current is passed through the coil 21y, the movable frame 111 moves in response to force in the Y-axis direction. If the direction of the current is changed, the movement direction of the movable frame 111 is switched. If the intensity of the current is changed, the magnitude of the force applied to the movable frame 111 can be changed.

The X-axis actuator 115 is similar in structure and function to the Y-axis actuator 116 except that the X-axis actuator 115 is located 90 degrees different in phase from the Y-axis actuator 116 in the XY plane. That is, if a current is passed through a coil 21x (FIG. 2) of the X-axis actuator 115, force in the X-axis direction is applied to the movable frame 111.

In addition, the position sensor 123 of the above-mentioned shake corrector 130 is attached to the movable frame 111. Although the position sensor 123 shown in FIG. 1 is separate from the movable frame 111, the hall elements 123x and 123y which function as the position sensor 123 are actually attached to the movable frame 111 of the driving device 120.

The hall elements 123x and 123y are located in the centers of the coils 21x and 21y to respectively face the magnets 22x and 22y of the two actuators 115 and 116 fixedly provided in the fixed frame 112. That is, the magnets 22x and 22y of the VCMs of the driving device 120 double as magnets for positional detection. Although two sets of magnets 22x and 22y and hall elements 123x and 123y are used in the present embodiment, only one of the sets may be provided. Alternatively, when high detection precision is not needed, open-loop control may be performed without the use of such hall elements. Although the magnet of the VCM has two functions in the present embodiment, an independent magnet for positional detection may be provided.

Here, the above-mentioned evacuation mechanism 140 of the lens frame 141 is described in detail with reference to FIG. 2 and FIG. 4.

In response to the retracting operation of the interchangeable lens 100, the evacuation mechanism 140 moves the lens frame 141 which holds the movable lens 103 relative to the movable frame 111 in the plane direction intersecting at right angles with the optical axis O, and thereby evaluates the lens frame 141 to the position which is out of alignment with the optical axis O. As a result, another unshown lens located in front of the movable frame 111 can be received in the openings 111a and 112a of the movable frame 111 and the fixed frame 112 from which the lens frame 141 has been evacuated. Accordingly, the size of the interchangeable lens 100 along the direction of the optical axis O can be reduced.

As in the present embodiment, when the interchangeable lens 100 attached to the camera body 200 is retracted and contracted, the camera can be compact when carried around, which can enhance portability and convenience. When the interchangeable lens 100 detached from the camera body 200 is retracted and contracted, the storage space for the interchangeable lens 100 can be reduced, the interchangeable lens 100 is easily carried around.

The evacuation mechanism 140 has an arm 142 which is integrally provided to project from the outer circumferential portion of the lens frame 141 and then extend away from the optical axis O. A substantially cylindrical bearing 144 having a hole 143 for receiving the rotation shaft 30 is integrally provided at the end of the arm 142 located apart from the lens frame 141. This hole 143 extends in the Z-axis direction. A lever 145 (see FIG. 2) extends on the side of the bearing 144 opposite to the arm 142. That is, the lens frame 141, the arm 142, the bearing 144, and the lever 145 are integrally formed.

The rotation shaft 30 for attaching the lens frame 141 to the movable frame 111 integrally has a shaft 31 to be inserted through the hole 143 of the bearing 144, a head 32 provided at the proximal end of the shaft 31, and a threaded portion 33 provided at the distal end of the shaft 31. The rotation shaft 30 is inserted through the hole 143 of the bearing 144 from the front of the lens frame 141, and the threaded portion 33 is threaded into and then fixed to a threaded hole 35 of the movable frame 111. In this condition, the head 32 regulates the movement of the front surface of the lens frame 141, and the hole 143 of the bearing 144 can rotate relative to the shaft 31. That is, in this condition, the lens frame 141 is rotatable between the position indicated by the solid line in FIG. 2 and the position indicated by the broken line.

A flange 146 having substantially the same diameter as that of the head 32 of the rotation shaft 30 is provided in the outer circumferential portion of the front side of the bearing 144. The arm 142 and the lever 145 integrally extend from the flange 146. In other words, the diameter of the outer circumferential portion of the bearing 144 except for the flange 146 is smaller than the diameter of the flange 146. A tensile coil spring 40 is annularly attached to the small-diameter outer circumferential portion of the bearing 144 between the flange 146 and the front surface of the movable frame 111. That is, this tensile coil spring 40 is attached to the bearing 144 in advance when the lens frame 141 is attached to the movable frame 111 by the use of the rotation shaft 30.

As shown in FIG. 2, one end 41 of the tensile coil spring 40 is hooked to a projection 51 provided in the outer circumferential portion of the movable frame 111, and the other end 42 is bent along the surface of the arm 142 and then hooked to the halfway point of the arm 142. Resilience which urges the arm 142 clockwise in FIG. 2 is generated in the tensile coil spring 40 in the condition in FIG. 2. In this condition, resilience in a direction (Z-axis direction) to press the bearing 144 toward the movable frame 111 is generated in the tensile coil spring 40.

That is, in this condition, resilience in a direction to press the projection 51 counterclockwise in FIG. 2 is applied to the one end 41 of the tensile coil spring 40, and resilience in a direction to press the arm 142 clockwise in FIG. 2 is applied to the other end 42 of the tensile coil spring 40. At the same time, resilience in a direction to press the projection 51 forward is applied to the one end 41 of the tensile coil spring 40, and resilience in a direction to backwardly press the arm 142 toward the movable frame 111 is applied to the other end 42 of the tensile coil spring 40.

Thus, clockwise turning force in FIG. 2 is always applied by the arm 142 and the tensile coil spring 40. However, the rotation of the arm 142 is inhibited by the contact of a stopper 52 projecting forward from the movable frame 111, and the lens frame 141 is positioned at the location indicated by the solid line in FIG. 2. Moreover, the arm 142 is always subjected to the press force in the Z-axis direction toward the movable frame 111 by the tensile coil spring 40. However, two slide projections 53 and 54 of the arm 142 contact the surface of the curved rail 55 of the movable frame 111, so that the movement in the Z-axis direction is regulated, and the lens frame 141 is positioned in the Z-axis direction.

The rail 55 of the movable frame 111 is a projecting portion having a substantially semicircular section as shown in FIG. 4, and is shaped like a halved donut. On the other hand, the two slide projections 53 and 54 of the arm 142 are projections having oval sections of columns extended in the rotation direction of the arm 142. Thus, the slide projections 53 and 54 come into point contact with the rail 55. The rail 55 is annularly curved along the movement paths of the slide projections 53 and 54, and the two slide projections 53 and 54 are provided apart from each other along the movement direction of the arm 142.

Thus, when the lens frame 141 is rotationally moved between the position indicated by the solid line in FIG. 2 and the position indicated by the broken line, the two slide projections 53 and 54 of the arm 142 are in slide contact with the rail 55 of the movable frame 111, and guide the evacuation operation of the lens frame 141. In this case, the two slide projections 53 and 54 located apart along the movement direction of the arm 142 function to prevent the arm 142 from being twisted. Therefore, these two slide projections 53 and 54 are preferably located as far from each other as possible, and are located apart from each other in the full width direction of the arm 142 in the present embodiment.

The section of the rail 55 is semicircular, so that even when the arm 142 is bent (i.e., the lens frame 141 is shifted in the Z-axis direction) during the movement of the lens frame 141, the contact between the two projections 53 and 54 can be maintained, and stable evacuation operation is possible.

Furthermore, in the present embodiment, the other end 42 of the tensile coil spring 40 is hooked to the arm 142 between a contact point of the rail 55 and the two projections 53 and 54 and a contact part of the bearing 144 and the movable frame 111. Therefore, the force which pulls the arm 142 toward the movable frame 111 acts between the bearing 144 and the two projections 53 and 54. As a result, tensile force in the Z-axis direction resulting from the tensile coil spring 40 is dispersed and thus applied to the movable frame 111 at the position facing the bearing 144 and at the position where the two projections 53 and 54 contact each other. Thus, the precision of the positioning of the lens frame 141 in the Z-axis direction can be higher.

Driving force to evacuate the lens frame 141 is supplied by the retracting operation of the interchangeable lens 100. That is, the driving source of the evacuation mechanism 140 is a rotary frame 60 which rotates during the retracting operation of the interchangeable lens 100. As shown in FIG. 2, the rotary frame 60 has an engaging portion 61 which acts on the lever 145 of the evacuation mechanism 140 during rotation.

That is, if the rotary frame 60 rotates counterclockwise in FIG. 2 during the retracting operation of the interchangeable lens 100, the engaging portion 61 comes into contact with the lever 145 at a predetermined rotational position. If the rotary frame 60 further rotates, the lever 145 rotates counterclockwise against the urging force of the tensile coil spring 40. Thus, the arm 142 rotates counterclockwise in FIG. 2 around the bearing 144, and the lens frame 141 is evacuated away from the optical axis O (in a lower right direction in FIG. 2). If the lens frame 141 is evacuated to the evacuation position indicated by the broken line in FIG. 2, the Lμcom 108 judges via an unshown position detecting sensor that the lens frame 141 is located at the evacuation position, and stops an actuator for retracting (not shown) located inside the driver 107 for driving the variable power lens.

In order to restore the lens frame 141 to the position indicated by the solid line in FIG. 2 from the evacuation position indicated by the broken line, the rotary frame 60 which has been rotated counterclockwise in FIG. 2 by the retracting operation is rotated clockwise in FIG. 2, and the lever 145 is disengaged from the engaging portion 61. As a result, the arm 142 is rotated clockwise in FIG. 2 by the resilience of the tensile coil spring 40, and the lens frame 141 is located at the position indicated by the solid line in FIG. 2.

Here, suitable layout of the components of the driving device 120 is described. The driving device 120 according to the present embodiment is a device for moving, in the plane direction, the movable frame 111 which holds the movable lens 103 having a relatively large location region in the center. Therefore, it is difficult to locate, in the vicinity of the center of the movable frame 111, components such as the three balls 113a, 113b, and 113c located between the movable frame 111 and the fixed frame 112, the tension spring 114, the VCMs 115 and 116, and the evacuation mechanism 140 attached to the movable frame 111. On the other hand, it is known that in order to stabilize the operation of the movable frame 111, the above-mentioned components are preferably equally arranged relative to the movable frame 111 in the plane direction.

In particular, only one tension spring 114 is attached in the present embodiment. Therefore, it is preferable that the single tension spring 114 is located in the center of the movable frame 111 if the balance of the press force on the three balls 113a, 113b, and 113c is considered. It is particularly preferable that the tension spring 114 is located at the center of gravity G of the later-described movable body 70 which moves together with the movable frame 111.

Thus, in the present embodiment, first of all, the tension spring 114 is disposed at the edge of the opening 111a of the movable frame 111, and the outer circumferential portion of the lens frame 141 which holds the movable lens 103 is partly cut inward so that the tension spring 114 is as close to the center of the movable frame 111 as possible.

In the meantime, in view of the layout of the three balls 113a, 113b, and 113c, it is preferable that the tension spring 114 is located inside the angle of the greatest degree among the three angles in order to ensure the space to place the tension spring 114. Thus, the present embodiment uses a layout in which the centers of the balls 113 are located at the three angles of an isosceles triangle having a vertical angle slightly smaller than 90 degrees. The tension spring 114 is located inside the ball 113a at the vertical angle of the greatest degree.

Therefore, the evacuation mechanism 140 uses a layout to have a movement path that traverses the side facing the above-mentioned vertical angle so that the lens frame 141 does not interfere with the tension spring 114 during the movement of the lens frame 141. In other words, the path on which the lens frame 141 is moved by the evacuation mechanism 140 traverses the longest side among the three sides of the triangle that connects the centers of the three balls 113a, 113b, and 113c.

The "angle of the greatest degree" and "longest side" referred to here apply to a triangle having any shape. For example, when the triangle that connects the centers of the three balls 113a, 113b, and 113c is an equilateral triangle, the "angle of the greatest degree" refers to all the three angles, and the "longest side" refers to all the three sides. In the case of an isosceles triangle having a vertical angle smaller than two base angles, the "angle of the greatest degree" refers to one of the two base angles, and the "longest side" refers to one of the two oblique sides.

Furthermore, if the above-mentioned layout of the evacuation mechanism 140 is used, the two VCMs 115 and 116 are located outside the remaining two sides on which the lens frame 141 is not moved by the evacuation mechanism 140. In other words, the two VCMs 115 and 116 are respectively located outside the two sides which intersect at the angle (vertical angle) where the tension spring 114 is located.

In the first place, the two VCMs 115 and 116 are located at the positions where the movable frame 111 can be moved along the X-axis and Y-axis, as described above. This naturally determines the layout of the three balls 113a, 113b, and 113c and the evacuation mechanism 140 as shown.

From a different point of view, when the two VCMs 115 and 116 are located outside the two sides which intersect at the vertical angle as in the present embodiment, the VCMs do not need to be located outside the longest side, and the lens frame 141 can be evacuated to the outside of the longest side by the evacuation mechanism 140.

For the stable movement of the movable frame 111, it is preferable that the center of gravity G of the movable body 70 which attaches, to the movable frame 111, components such as the movable lens 103, the tension spring 114, the evacuation mechanism 140, the coils 21x and 21y and the yokes 23x and 32y of the VCMs 115 and 116, and the hall elements 123x and 123y is as close to the optical axis O as possible.

It is obvious that in the present embodiment, the center of gravity G is slightly shifted to the upper left in FIG. 2 where the relatively heavy coils 21x and 21y of the two VCMs 115 and 116 are attached, but the center of gravity G is almost closer to the optical axis O. In the layout according to the present embodiment, the center of gravity G of the movable body 70 is located inside the triangle that connects the centers of the three balls 113a, 113b, and 113c.

As described above, the layout shown in FIG. 2 is used, so that the press force by the tension spring 114 can be dispersed and thus applied to the three balls 113a, 113b, and 113c, and the movable frame 111 can be stably and precisely driven. Thanks to this layout, it is not necessary to ensure the space to locate the tension spring 114 outside the triangle that connects the centers of the three balls 113a, 113b, and 113c. The diameter of the movable frame 111 can be relatively reduced. The device configuration can be smaller and lighter. The amount of electricity consumed by the driving device 120 can be reduced.

The tension spring 114 is disposed at the edge of the opening 111a of the movable frame 111 so that the lens frame 141 is evacuated away from the tension spring 114 by the evacuation mechanism 140. The use of this configuration can facilitate the attachment of the tension spring 114 even if the tension spring 114 is located inside the triangle that connects the centers of the three balls 113a, 113b, and 113c. That is, when the tension spring 114 is attached, the lens frame 141 can be evacuated by the evacuation mechanism 140, and the lens frame 141 can be easily attached to the hook exposed at the edge of the opening 111a.

Now, the operation of the camera system 10 according to the present embodiment is described with reference to a flowchart shown in FIG. 7.

Figure 7:
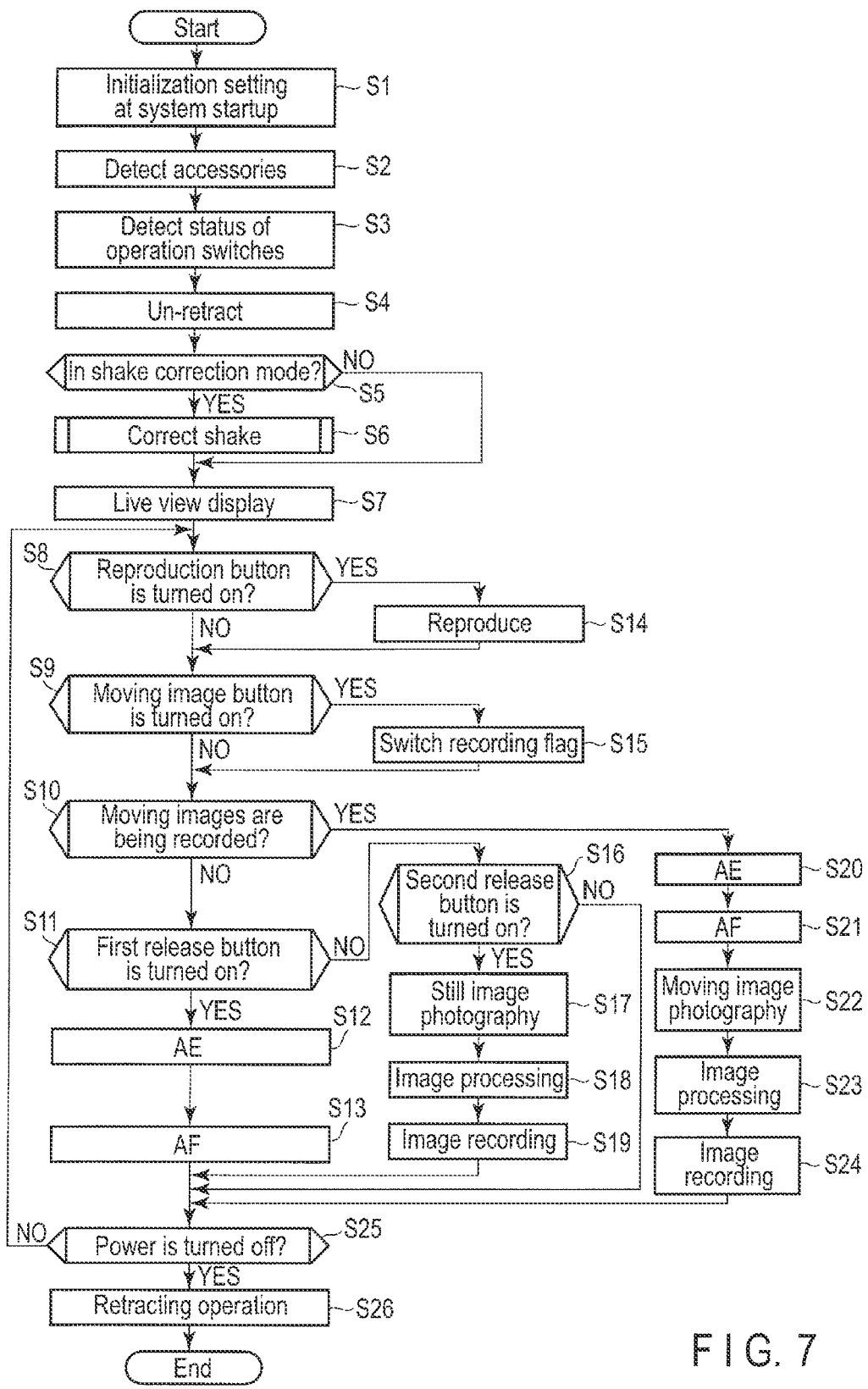
FIG. 7 is a flowchart illustrating the operation of the camera system in FIG. 1.

When power is applied by the operation of the power button, the Bµcom 214 starts the operation of the main flow shown in FIG. 7.

Once the operation is started, the Bµcom 214 first performs initialization at system startup in which a recording flag is initialized to off (step S1). This recording flag is a flag which indicates whether moving images are being recorded. The recording flag which is on indicates that moving images are being recorded. The recording flag which is off indicates that moving images are not being recorded.

After the end of the initialization at system startup, the Bµcom 214 detects accessories such as the interchangeable lens 100 connected to the camera body 200 (step S2), and detects the status of operation switches such as the reproduction button (step S3).

At the same time, the Bµcom 214 moves and thus un-retracts each of the retracted driving lenses of the imaging lens 110 forward in the direction of the optical axis O (step S4). In this case, the rotary frame 60 rotates clockwise in FIG. 2 in response to the un-retracting operation, and the lens frame 141 is laid over the opening 111a of the movable frame 111 and located at the position shown in FIG. 2.

The Bµcom 214 then determines whether a shake correction mode switch is on (step S5). If it is determined that the operation mode of the camera system 10 is a shake correction mode (step S5; YES), the Bµcom 214 controls the shake corrector 130 via the Lµcom 108 to actuate the driving device 120, and starts a shake correction operation (step S6).

When it is judged in step S5 that the operation mode of the camera system 10 is not the shake correction mode, the Bµcom 214 displays a live view after starting the shake correction operation in step S6 (step S7). Here, an image signal is acquired by the image pickup device 202, the image is processed for the live view display, and the live view is displayed via the LCD 210.

In this condition, the Bµcom 214 determines whether the reproduction button is pressed (step S8). When it is determined that the reproduction button is pressed (step S8; YES), the Bµcom 214 reproduces the image (step S14). Here, image data is read from the recording medium 212, and displayed on the LCD 210. In this condition, the shake correction operation is not needed even in the shake correction mode.

After the reproduction in step S14 or when the reproduction button has not been pressed in step S8 (step S8; NO), the Bµcom 214 then determines whether the moving image button is pressed (step S9). In step S9, the operation unit 216 detects and thereby determines the operation status of the moving image button.

When it is determined that the moving image button is pressed (step S9; YES), the Bμcom 214 switches the recording flag (step S15). As described above, the moving image button alternates between the start and end of moving image photography whenever pressed. Therefore, in this step, the recording flag which is off is switched on, and the recording flag which is on is switched off.

After the recording flag is switched in step S15 or when it is determined in step S9 that the moving image button has not been pressed (step S9; NO), the Bμcom 214 then determines whether moving images are being recorded (step S10). Moving images are being recorded if the recording flag is on. Thus, whether moving images are being recorded is determined here by whether the recording flag is on.

When it is determined in step S10 that moving images are not being recorded (step S10; NO), the Bμcom 214 determines whether the first release is pressed, i.e., whether the first release switch is turned on from the off state (step S11). The operation unit 216 detects the status of the first release switch interlocked with the release button, and the above determination is made on the basis of the result of the detection. In step S11, whether the first release switch is turned on from the off state, and the determination result is NO if the first release switch remains turned on.

When it is determined in step S11 that the first release is pressed (step S11; YES), the Bμcom 214 performs image photography at the time of the pressing of the first release, and the Bμcom 214 performs automatic exposure (step S12). The image photography here includes acquiring an image signal by the image pickup device 202, performing image processing, and acquiring image data used for the automatic exposure, and does not include recording the image data in the recording medium 212.

In this automatic exposure, the AE processor 205 measures the luminance of the subject, and determines exposure control values such as an aperture value and a shutter speed. The AE processor 205 also determines a control value for the live view to be displayed on the LCD 210 with correct exposure.

This automatic exposure is followed by automatic focus (step S13). Here, some of the lenses of the imaging lens 110 are wobbled (slightly oscillated in the optical axis direction). Thus, the contrast of the image data acquired by the image pickup device 202 is evaluated, and then the direction of the focal position is detected. At the same time, the focus lens 101 is moved in the detected direction, and the focus lens 101 is controlled so that the image will have the maximum contrast.

When it is determined in step S11 that the release button has not been pressed and the first release switch has not been turned on from the off state (step S11; NO), the Bμcom 214 then determines whether the second release is pressed, i.e., whether the release button is fully pressed and the second release switch is turned on from the off state (step S16). In step S16, the operation unit 216 detects and thereby determines the status of the second release switch interlocked with the release button.

When it is determined in step S16 that the second release is pressed (step S16; YES), the Bμcom 214 performs still image photography (step S17). Here, the image pickup device 202 performs exposure and acquires an image signal corresponding to the subject image, and temporarily stores the image signal in the SDRAM 213. After this still image photography, the image processor 206 then reads the image signal from the SDRAM 213, performs image processing regarding still image data based on the image signal (step S18), and records the image data in the recording medium 212 after compressed (step S19).

When it is determined in step S10 that moving images are being recorded (step S10; YES), the Bμcom 214 then performs automatic exposure as in step S12 (step S20). Further, automatic focus is performed in the same manner (step S21), and moving image photography is then performed (step S22). Here, the image pickup device 202 acquires a moving image signal, and the image processor 206 performs image processing of the image data (step S23). After image compression of the moving images in the image compressor/decompressor 208, the moving image data is recorded in the recording medium 212 (step S24).

When the AF operation is finished in step S13, when the image recording is finished in step S19, when it is determined in step S16 that the release button is fully pressed (step S16; NO), or when the moving image data has been recorded in the recording medium 212 in step S24, the Bμcom 214 determines whether the power switch of the operation unit 216 is turned off (step S25).

When it is determined that the power is not off (step S25; NO), the Bμcom 214 returns to the processing in step S8. When it is determined on the other hand that the power is off (step S25; YES), the Bμcom 214 starts the retracting operation of the interchangeable lens 100 (step S26).

In response to the retracting operation in step S26, the rotary frame 60 rotates counterclockwise in FIG. 2, and the lens frame 141 is evacuated to the evacuation position indicated by the broken line in FIG. 2. The Bμcom 214 then finishes the main flow after a main flow finishing operation.

Figure 8:
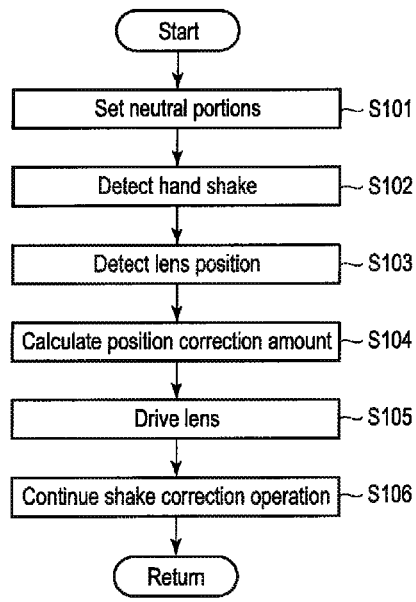
FIG. 8 is a flowchart illustrating a shake correction function.

Now, the shake correction operation in step S6 in FIG. 7 is described with reference to a flowchart shown in FIG. 8.

When the shake correction operation is started, the Lμcom 108 detects the position of the movable frame 111 in the plane direction via the X-position sensor 123x and the Y-position sensor 123y, and at the same time actuates the two VCMs 115 and 116 to drive and control the movable frame 111 to neutral portions so that the center of the movable lens 103 overlaps the optical axis O (step S101).

Then the Lμcom 108 detects an angular velocity generated by a shake via the X-axis gyro 121 and the Y-axis gyro 122 (step S102). The Lμcom 108 detects the position of the movable lens 103 in the plane direction via the X-position sensor 123x and the Y-position sensor 123y (step S103). The vibration-proof control circuit 124 converts the angular velocity and the positional information to digital signals. The Lμcom 108 then combines status information such as the focal positions and focal distances of other imaging lenses 110 to calculate a position correction amount of the movable lens 103 (step S104).

The position correction amount is input to the vibration-proof control circuit 124, and is output as a actuator driving instruction value to the actuator drive circuit 125 from the vibration-proof control circuit 124. The VCM 115 and the VCM 116 are then driven by the actuator drive circuit 125 in accordance with the driving instruction value, and the movable lens 103 is displaced to correct the shake (step S105).

The operation from step S102 to step S105 is repeated and continued (step S106). While the shake correction operation is continued, the operation returns to the operation flow of the camera system 10 in FIG. 7. The shake correction operation is stopped when the mode is changed to a mode without shake correction such as the reproduction in step S14 that requires no shake correction and when the power is switched off.

Now, the balance of the force applied to the driving device 120 is described with reference to FIG. 9.

Figure 9:
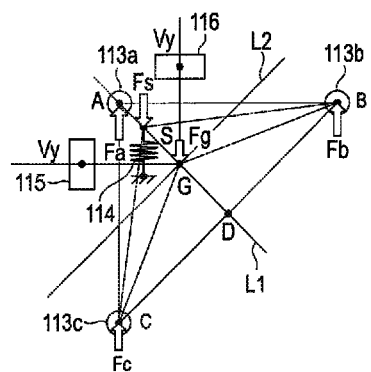
FIG. 9 is a diagram illustrating the balance of force applied to the driving device in FIG. 2.

FIG. 9 is a conceptual diagram showing, on a plane intersecting at right angles with the optical axis, force applied in the optical axis direction and the position when the driving device 120 is disposed in such a posture that the optical axis O is adjusted to a gravitational direction. Here, the weight of the movable lens 103 is received by the three balls 113a, 113b, and 113c. The centers of the balls 113a, 113b, and 113c are A, B, and C. The equilibrium of force is considered as in Equation (1) below:

$$Fg+Fs=Fa+Fb+Fc \quad (1)$$

wherein Fg is the gravity applied to the movable lens 103, reaction forces from the balls 113a, 113b, and 113c are Fa, Fb, and Fc, and Fs is the tensile force by the tension spring 114.

The center of gravity of the above-mentioned movable body 70 is G. The point of application of the force by the tension spring 114 is S. The equilibrium of moment generated on an axis L1 passing through the center of the ball 113a and the center of gravity G is considered. As a line BC intersects at right angles with the axis L1, Equation (2) below is satisfied:

$$BD \times Fb = CD \times Fc \quad (2).$$

In the meantime, the equilibrium of moment generated on an axis L2 which intersects at right angles with the axis L1 and which passes through the center of gravity G is as shown in Equation (3) below:

$$AG \times Fa - SG \times Fs = DGX(Fb+Fc) \quad (3).$$

The equilibrium in Equation (3) is satisfied as long as the point of application S of the tension spring 114 is within the triangle ABC, which shows that the movable lens 103 can be stably held. The balance is only lost in this condition when FG is negative and Fg+Fs<0. Under such circumstances, the movable lens 103 cannot be held. However, the spring force of the tension spring 114 is naturally set so that Fg+Fs>0.

Furthermore, the equilibrium of force and moment also needs to be considered in the Z-axis direction. In the present embodiment, the point of application of force by the VCMs 115 and 116 is shifted in the Z-axis direction relative to the center of gravity G of the movable body 70 as shown in FIG. 3. A distance Zv between these two points along the optical axis direction causes moment dependent on the length of the arm 142. Thus, the tensile force by the tension spring 114 needs to be set in consideration of this moment.

(Second Embodiment)

Now, a driving device 300 according to a second embodiment of the present invention is described with reference to FIG. 10 to FIG. 12. This driving device 300 includes components similar to those in the driving device 120 according to the first embodiment shown in FIG. 2 to FIG. 6. Therefore, components different form those in the first embodiment are described here. Components similar in function to those in the first embodiment are indicated by the same reference signs and are not described in detail here.

FIG. 10 is a front view of the driving device 300 seen from the front along the optical axis O. FIG. 11 is a sectional view of the driving device 300 taken along the line F11-F11 in FIG. 10. FIG. 12 is a sectional view of the driving device 300 taken along the line F12-F12 in FIG. 10.

As shown in FIG. 10, this driving device 300 has a structure in which two actuators 115 and 116 are line-symmetrically located with respect to the Y-axis. The left actuator 115 in FIG. 10 drives a movable frame 111' along a direction which forms an angle of 135 degrees with the X-axis along an XY plane. The right actuator 116 in FIG. 10 drives the movable frame 111' along a direction which forms an angle of 45 degrees with the X-axis along an XY plane. That is, the two actuators 115 and 116 are laid out 90 degrees different in angle from each other. The movable frame 111' can be moved to a desired direction along the XY plane by the combination of the operations of the two actuators 115 and 116.

Figure 11:
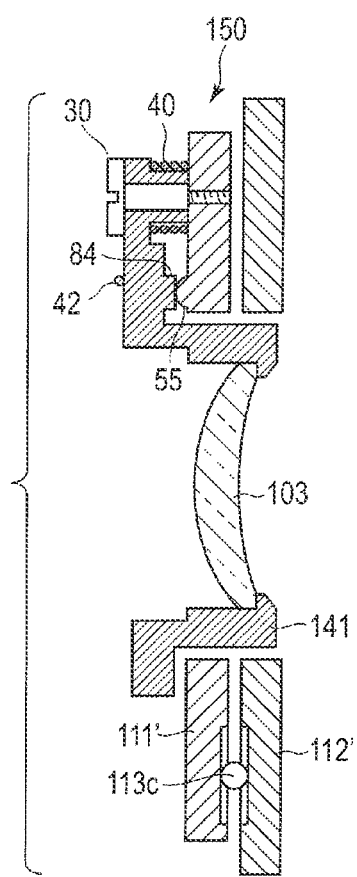
FIG. 11 is a sectional view of the driving device in FIG. 10 taken along the line F11-F11.
Figure 12:
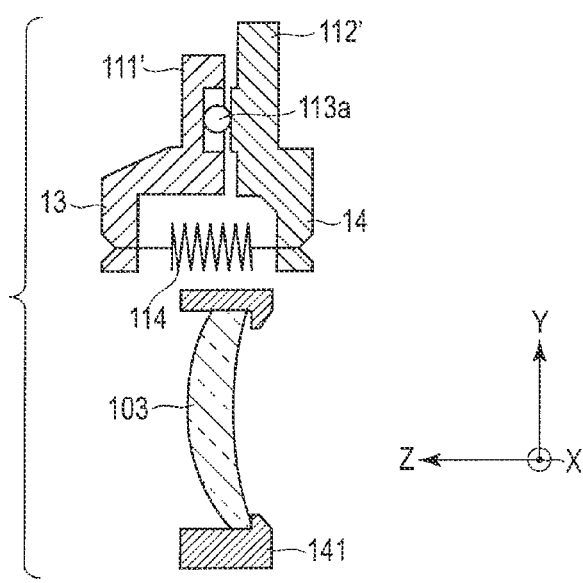
FIG. 12 is a sectional view of the driving device in FIG. 10 taken along the line F12-F12.

In the layout according to the present embodiment, as shown in FIG. 11 and FIG. 12, the movable lens 103 is located in the rear, and the movable lens 103 is disposed in an opening 111a of the movable frame 111' and an opening 112a of a fixed frame 112', in contrast with the first embodiment. In other words, the movable lens 103 is set back in the optical axis direction so that the center of gravity G of a movable body 70, the centers of three balls 113a, 113b, and 113c, and the point of application of force applied to each of VCMs 115 and 116 are located in the same plane intersecting at right angles with the optical axis O. Thus, no moment is caused by force generated in the optical axis direction around the center of gravity G of the movable body 70, and the movable lens 103 can be more stably held and driven. In addition, the movable lens 103 is disposed in the opening 111a of the movable frame 111' and the opening 112a of the fixed frame 112'. This permits a compact device configuration along the optical axis O.

Furthermore, in the present embodiment, as shown in FIG. 10, the upper part of the movable lens 103 is partly cut so that the center of gravity G of the movable body 70 corresponds to the optical axis O. That is, part of the movable lens 103 is cut on the side where coils 21 of the relatively heavy VCMs 115 and 116 so that the center of gravity G of the whole movable body 70 is shifted down in FIG. 10. As a result, the central lines which pass through the points of application of the forces by the two VCMs 115 and 116 intersect with each other on the optical axis O, and the operation of the movable frame 111' can be more stable.

On the other hand, when the movable lens 103 is disposed in the opening 111a of the movable frame 111' and the opening 112a of the fixed frame 112', part of the movable frame 111' and part of the fixed frame 112' block the way of the evacuation of a lens frame 141. Therefore, part of the movable frame 111' and part of the fixed frame 112' that are located in the evacuation path of the lens frame 141 are cut in the present embodiment.

In an evacuation mechanism 150, when the lens frame 141 is located at a position indicated by the solid line in FIG. 10, part of the lens frame 141 overlaps the front of the movable frame 111'. Inside this overlapping part, two support projections 81 and 82 are provided. One slide projection 84 which is in slide contact with a rail 55 of the movable frame 111' is provided inside an arm 142 extending integrally with the lens frame 141.

As shown, the slide projection 84 of the arm 142 and the support projections 81 and 82 of the lens frame 141 are located apart from each other. Thus, the lens frame 141 can be more stably supported on the movable frame 111'. Moreover, the two support projections 81 and 82 of the lens frame 141 are located apart from each other as shown. This further ensures that the twisting of the arm 142 can be prevented. That is, according to the present embodiment, the lens frame 141 can be supported at three points by the projections 81, 82, and 84, which enables stable support.

The present invention is not limited to the embodiments described above, and can be suitably modified without departing from the spirit and concept thereof that can be read from the claims, specification, and illustrations. Lenses, cameras, and camera systems involving such modifications also fall within the technical scope of the present invention.

For example, the drive mechanism 120 described above in the embodiment moves the lens frame 141 holding the movable lens 103 which is a convex lens in the plane direction intersecting at right angles with the optical axis O. However, if an optical image formed by the imaging lens 110 of the interchangeable lens 100 can be moved along the XY plane, a mechanism which moves some other optical member in the plane direction may be used. One such movable optical member may be, for example, a concave lens or diffraction grating. It is also possible to use a mechanism which moves the image pickup device 202 at the camera body 200 in the plane direction intersecting at right angles with the optical axis O instead of moving the optical member at the imaging lens 110.

In the embodiment described above, the structure which can evacuate the lens frame 141 holding the movable lens 103 relative to the movable frame 111 (111') is used. However, the lens frame 141 and the evacuation mechanism 140 (150) are not always necessary. The movable lens 103 may be structured to be directly held on the movable frame 111 (111'). Although the camera described above in the embodiments uses the interchangeable lens 100 in the camera body 200, the present invention may be applied to a one-piece camera with an uninterchangeable lens.

What is claimed is:

1. A driving device comprising:
   a first member which holds at least one optical member included in an optical system configured to form an image of a subject on an imaging unit;
   a second member which adjoins and faces the first member along an optical axis of the optical system;
   three rolling elements located between the first member and the second member outside a holding region where the first member holds the at least one optical member, each of the rolling elements having a center;
   a single urging member located outside the holding region and inside a triangle that connects the centers of the three rolling elements, the urging member urging the first and second members closer to each other to press the three rolling elements; and
   a driving unit which moves the first member relative to the second member in a plane direction intersecting at right angles with the optical axis.

2. The driving device of claim 1, wherein
   the urging member is located adjacent an angle of the greatest degree among three angles of the triangle.

3. The driving device of claim 2, wherein
   the driving unit is located outside two sides of the triangle which intersect at the angle where the urging member is located.

4. The driving device of claim 1, wherein
   the center of gravity of a movable body is located inside the triangle, the movable body attaching components of the driving unit to the first member which holds the optical member.

5. The driving device of claim 2, further comprising:
   an evacuation mechanism which evacuates the at least one optical member to a position outside the holding region.

6. The driving device of claim 5, wherein
   the evacuation mechanism moves the optical member in the plane direction to evacuate the optical member across the longest side among three sides of the triangle.

7. An image instrument comprising:
   an image pickup device which converts an image of a subject into an electric signal;
   an optical lens which forms the image of the subject on the image pickup device;
   a first member which holds the optical lens;
   a second member which adjoins and faces the first member along an optical axis of the optical lens;
   three rolling elements located between the first member and the second member outside a holding region where the first member holds the optical lens, each of the rolling elements having a center;
   a single urging member located outside the holding region and inside a triangle that connects the centers of the three rolling elements, the urging member urging the first and second members closer to each other to press the three rolling elements; and
   a driving unit which moves the first member relative to the second member in a plane direction intersecting at right angles with the optical axis.

8. The image instrument of claim 7, wherein
   the urging member is located adjacent an angle of the greatest degree among three angles of the triangle.

9. The image instrument of claim 8, wherein
   the driving unit is located outside two sides of the triangle which intersect at the angle where the urging member is located.

10. The image instrument of claim 7, wherein
    the center of gravity of a movable body is located inside the triangle, the movable body attaching components of the driving unit to the first member which holds the optical lens.

11. The image instrument of claim 10, wherein
    the center of gravity of the movable body is located on the optical axis.

12. The image instrument of claim 8, further comprising:
    an evacuation mechanism which evacuates the optical lens to a position outside the holding region.

13. The image instrument of claim 12, wherein
    the evacuation mechanism moves the optical lens in the plane direction to evacuate the optical lens across the longest side among three sides of the triangle.

14. A driving device comprising:
    a first member which holds at least one optical member included in an optical system configured to form an image of a subject on an imaging unit;
    a second member which adjoins and faces the first member along an optical axis of the optical system;
    three rolling elements located between the first member and the second member outside a holding region where the first member holds the at least one optical member, each of the rolling elements having a center;
    a single urging member located outside the holding region and inside a triangle that connects the centers of the three rolling elements, the urging member urging the first and second members closer to each other to press the three rolling elements; and
    a driving unit which moves the first member relative to the second member in a plane direction intersecting at right angles with the optical axis;
    wherein the center of gravity of the movable body is located on the optical axis, the movable body attaching components of the driving unit to the first member which holds the optical member.

* * * * *